US012062344B2

(12) United States Patent
Chang et al.

(10) Patent No.: US 12,062,344 B2
(45) Date of Patent: Aug. 13, 2024

(54) DISPLAY DEVICE AND BACKLIGHT CONTROL METHOD FOR DISPLAY DEVICE

(71) Applicants: Innolux Corporation, Miaoli County (TW); CARUX TECHNOLOGY PTE. LTD., Singapore (SG)

(72) Inventors: Yi-Cheng Chang, Tainan (TW); Yu-Ming Wu, Miaoli County (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/464,293

(22) Filed: Sep. 11, 2023

(65) Prior Publication Data

US 2024/0127765 A1 Apr. 18, 2024

(30) Foreign Application Priority Data

Oct. 13, 2022 (CN) ......................... 202211255337.8

(51) Int. Cl.
*G09G 3/34* (2006.01)

(52) U.S. Cl.
CPC ..... *G09G 3/3426* (2013.01); *G09G 2300/026* (2013.01); *G09G 2320/0233* (2013.01); *G09G 2320/0686* (2013.01); *G09G 2360/16* (2013.01)

(58) Field of Classification Search
CPC ........... G09G 3/3426; G09G 2300/026; G09G 2320/0233; G09G 2320/0686; G09G 2360/16
See application file for complete search history.

(56) References Cited

U.S. PATENT DOCUMENTS

| | | | | |
|---|---|---|---|---|
| 9,105,243 | B2 * | 8/2015 | Shiomi | G09G 3/3426 |
| 9,978,319 | B2 * | 5/2018 | Furumoto | G02F 1/1347 |
| 10,121,420 | B2 * | 11/2018 | Kato | G09G 3/3426 |
| 10,283,060 | B2 * | 5/2019 | Kato | G02F 1/137 |
| 10,475,403 | B2 * | 11/2019 | Furumoto | G02F 1/1347 |
| 10,573,256 | B2 * | 2/2020 | Kato | G09G 3/3648 |

(Continued)

FOREIGN PATENT DOCUMENTS

| | | |
|---|---|---|
| CN | 108962179 | 12/2018 |
| CN | 110910838 | 3/2020 |

OTHER PUBLICATIONS

"Office Action of Taiwan Counterpart Application", issued on Jan. 9, 2024, p. 1-p. 8.

*Primary Examiner* — Gene W Lee
(74) *Attorney, Agent, or Firm* — JCIPRNET

(57) ABSTRACT

Disclosed are a display device and a backlight control method for the display device. The display device includes a display panel, a backlight source, a first computing unit, and a second computing unit. The display panel includes a first display region and a second display region. The first light-emitting region corresponds to the first display region. The second light-emitting region corresponds to the second display region. The first computing unit calculates a first brightness distribution within a first range. The second computing unit calculates a second brightness distribution within a second range. The first light-emitting region emits light according to the first brightness distribution. The second light-emitting region emits light according to the second brightness distribution.

20 Claims, 10 Drawing Sheets

(56) References Cited

U.S. PATENT DOCUMENTS

| | | | | |
|---|---|---|---|---|
| 11,620,964 | B2 * | 4/2023 | Ishihara | G09G 3/3666 345/690 |
| 2009/0140975 | A1 | 6/2009 | Nonaka et al. | |
| 2018/0157121 | A1 * | 6/2018 | Matsuura | G02F 1/133611 |
| 2018/0240419 | A1 * | 8/2018 | Tada | G02F 1/133611 |
| 2020/0090598 | A1 * | 3/2020 | Sohn | G09G 3/3644 |
| 2021/0027724 | A1 * | 1/2021 | Murai | G09G 3/3426 |

* cited by examiner

DISPLAY DEVICE AND BACKLIGHT CONTROL METHOD FOR DISPLAY DEVICE

CROSS-REFERENCE TO RELATED APPLICATION

This application claims the priority benefit of China application serial no. 202211255337.8, filed on Oct. 13, 2022. The entirety of the above-mentioned patent application is hereby incorporated by reference herein and made a part of this specification.

BACKGROUND

Technical Field

The disclosure relates to an electronic device and a control method for the electronic device, and in particular to a display device and a backlight control method for the display device.

Description of Related Art

As the requirements set for image quality of display devices are higher and higher, backlight modules with a local dimming function have been developed. With local dimming function, picture contrast of the display device may be improved.

With different applications (such as the application of a large area or the application of extending the display range along a single direction), the backlight module of the display device is divided into a plurality of light-emitting regions. A plurality of backlight control circuits are provided to perform divisional light emission control of the plurality of light-emitting regions in parallel. However, in the case of divisional control, one of the plurality of backlight control circuits is unable to obtain the image data of other light-emitting regions. Therefore, the brightness at the boundary of the plurality of light-emitting regions may be insufficient, which might degrade the image quality of the display device.

SUMMARY

The present disclosure is directed to a display device and a backlight control method for the display device, which may maintain the image quality of the display device when multiple backlight control circuits perform local dimming in a divisional manner.

According to an embodiment of the present disclosure, a display device includes a display panel, a backlight source, a first computing unit, and a second computing unit. The display panel includes a first display region and a second display region. The backlight source is provided below the display panel. The backlight source includes a first light-emitting region and a second light-emitting region. The first light-emitting region corresponds to the first display region. The second light-emitting region corresponds to the second display region. The first computing unit calculates a first brightness distribution within a first range. The second computing unit calculates a second brightness distribution within a second range. The first range includes the first display region and a first part of the second display region. The second range includes the second display region and a second part of the first display region. The first light-emitting region of the backlight source emits light according to the first brightness distribution. The second light-emitting region of the backlight source emits light according to the second brightness distribution.

According to an embodiment of the present disclosure, a backlight control method is applied to a display device. The display device includes a display panel, a backlight source, a first computing unit, and a second computing unit. The display panel includes a first display region and a second display region. The control method includes: dividing the backlight source into at least a first light-emitting region and a second light-emitting region, the first light-emitting region corresponds to the first display region, and the second light-emitting region corresponds to the second display region; calculating a first brightness distribution in a first range by the first computing unit, and calculating a second brightness distribution within a second range by the second computing unit, the first range includes the first display region and a first part of the second display region, and the second range includes the second display region and a second part of the first display region; controlling the first light-emitting region of the backlight source to emit light according to the first brightness distribution, and controlling the second light-emitting region of the backlight source to emit light according to the second brightness distribution.

Based on the above, the first computing unit calculates the first brightness distribution in the first range. The first range includes the first display region and the first part of the second display region. The second computing unit calculates the second brightness distribution within the second range. The second range includes the second display region and the second part of the first display region. Therefore, the first brightness distribution includes the brightness distribution of the first part of the second display region. The second brightness distribution includes a brightness distribution of the second part of the first display region. In addition, the first light-emitting region of the backlight source emits light according to the first brightness distribution. The second light-emitting region of the backlight source emits light according to the second brightness distribution. Therefore, in the case that a plurality of backlight control circuits perform local dimming in a divisional manner, the brightness at the boundary between the first display region and the second display region will not be reduced, and the image quality of the display device may be maintained.

DESCRIPTION OF THE EMBODIMENTS

Figure 1:
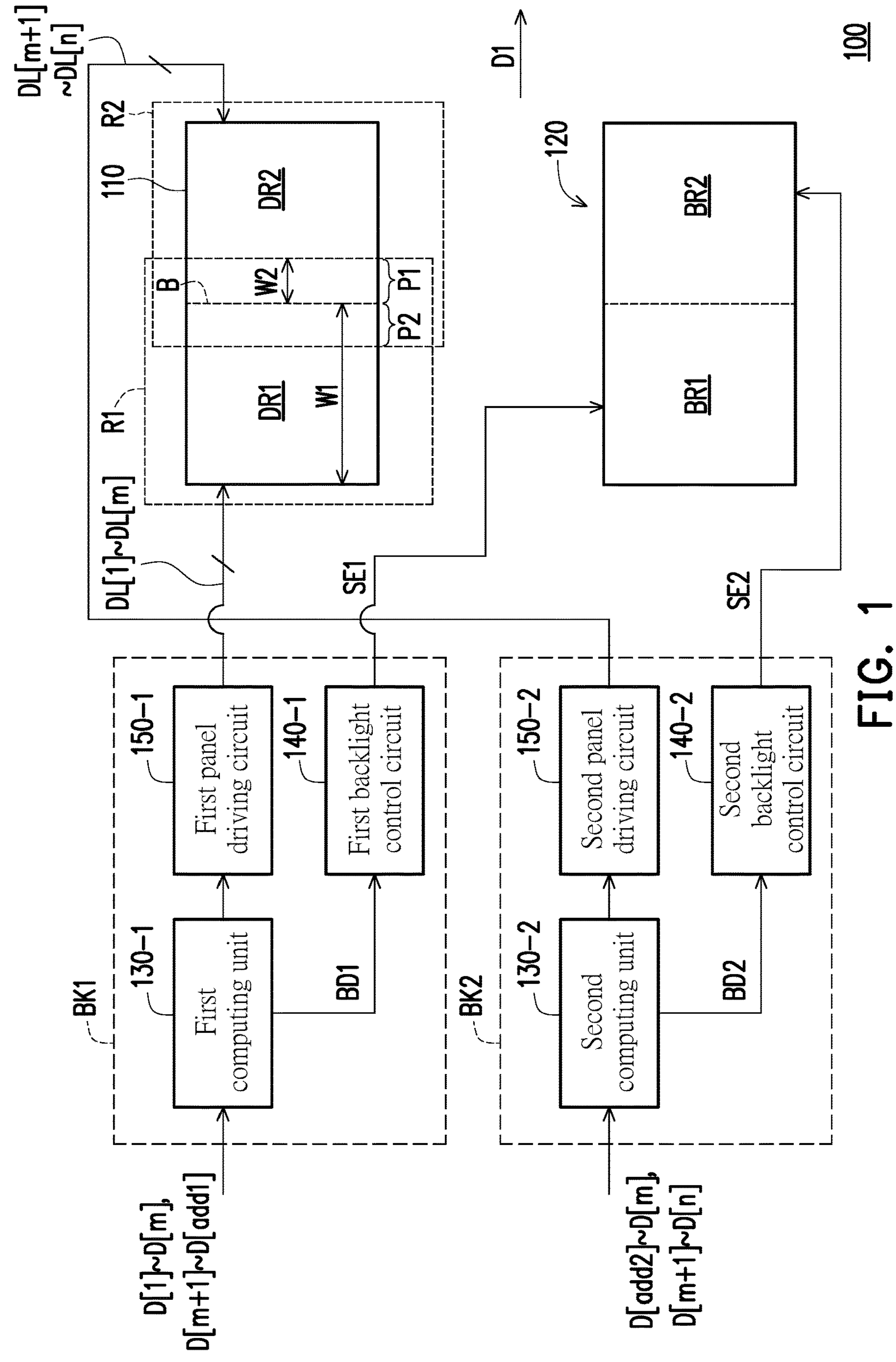
FIG. 1 is a schematic diagram of a display device according to a first embodiment of the disclosure.

The present disclosure may be understood by referring to the following detailed description in conjunction with the accompanying drawings as described below. It should be noted that, for clarity and ease of understanding, each drawing of the present disclosure shows a part of an electronic device, and some components in each drawing may not be drawn to scale. In addition, the number and size of each device depicted in the drawings are illustrative only and not intended to limit the scope of the present disclosure.

Certain terms are used throughout the description and the following claims to refer to specific components. As will be understood by those skilled in the art, electronic device manufacturers may refer to components by different names. This document does not intend to distinguish between components that differ in name but not function. In the following description and in the claims, the terms "comprising", "including" and "having" are used in an open-ended manner and should therefore be construed to mean "including but not limited to . . . " Therefore, when the terms "comprising", "including" and/or "having" are used in the description of the disclosure, they indicate the existence of corresponding features, regions, steps, operations and/or components, but are not limited to the existence of one or more corresponding features, regions, steps, operations and/or components.

It should be understood that when a component is referred to as being "coupled to", "connected to" or "conducted to" another component, the component may be directly connected to the other component and may directly establish an electrical connection, or there may be intermediate components between these components for relay electrical connection (indirect electrical connection). In contrast, when a component is referred to as being "directly coupled to," "directly conducted to," or "directly connected to" another component, there are no intermediate components present.

Although terms such as first, second, third, etc. may be used to describe various constituent components, such constituent components are not limited by these terms. The terms are used only to distinguish a constituent component from other constituent components in the specification. The claims may not adopt the same terms, but may adopt the terms first, second, third etc. with respect to the required order of the components. Therefore, in the following description, a first constituent component may be a second constituent component in the claims.

The electronic device disclosed herein may include a display device, an antenna device, a sensing device, a light-emitting device, a touch display device, a curved display device or a free shape display device, but the disclosure is not limited thereto. Electronic devices may include bendable or flexible electronic devices. The electronic device may include, for example, liquid crystal, light-emitting diode, quantum dot (QD), fluorescence, phosphor, other suitable display media, or a combination of the above materials, but is not limited thereto. The light-emitting diode may include, for example, an organic light emitting diode (OLED), a mini LED, a micro LED, or a quantum dot LED (which may include QLED, QDLED), or other suitable materials, or a combination of the above, but not limited thereto. The display device may, for example, include a spliced display device, but is not limited thereto. The antenna device may be, for example, a liquid crystal antenna, but is not limited thereto. The antenna device may include, for example, an antenna splicing device, but is not limited thereto. It should be noted that the electronic device may be any permutation and combination of the above, but not limited thereto. In addition, the shape of the electronic device may be rectangular, circular, polygonal, shapes with curved edges, or other suitable shapes. The electronic device may have peripheral systems such as a driving system, a control system, a light source system, etc. to support a display device, an antenna device or a splicing device, but the disclosure is not limited thereto. The sensing device may include a camera, an infrared sensor or a fingerprint sensor, etc., and the present disclosure is not limited thereto. In some embodiments, the sensing device may further include a flashlight, an infrared (IR) light source, other sensors, electronic components, or a combination thereof, but is not limited thereto.

In the present disclosure, the embodiments adopt "pixel" or "pixel unit" as a unit for describing a unit of a specific region including at least one functional circuit for at least one specific function. The region of a "pixel" depends on the unit used to provide a particular function, adjacent pixels may share the same parts or wires, but may also contain specific parts of themselves. For example, adjacent pixels may share the same scan line or the same data line, but a pixel may also have its own transistor or capacitor.

It should be noted that technical features in different embodiments described below can be replaced, reorganized or mixed with each other to form another embodiment without departing from the spirit of the present disclosure.

Please refer to FIG. 1, which is a schematic diagram of a display device according to a first embodiment of the disclosure. In this embodiment, the display device 100 includes a display panel 110, a backlight source 120, a first computing unit 130-1 and a second computing unit 130-2. The display panel 110 includes a first display region DR1 and a second display region DR2. The backlight source 120 is disposed below the display panel 110. The backlight source 120 is configured to provide the light source required by the display panel 110. The backlight source 120 includes a first light-emitting region BR1 and a second light-emitting region BR2. The first light-emitting region BR1 corresponds to the first display region DR1. The second light-emitting region BR2 corresponds to the second display region DR2.

The first computing unit 130-1 calculates the first brightness distribution BD1 within the first range R1. The second computing unit 130-2 calculates the second brightness distribution BD2 within the second range R2. The first range R1 includes the first display region DR1 and the first part P1 of the second display region DR2. The second range R2 includes the second display region DR2 and the second part P2 of the first display region DR1. The first light-emitting region BR1 of the backlight source 120 emits light according to the first brightness distribution BD1. The second light-emitting region BR2 of the backlight source 120 emits light according to the second brightness distribution BD2.

In this embodiment, the display device 100 further includes a first backlight control circuit 140-1, a second backlight control circuit 140-2, a first panel driving circuit 150-1, and a second panel driving circuit 150-2. The first backlight control circuit 140-1 is coupled to the first light-emitting region BR1 and the first computing unit 130-1. The first backlight control circuit 140-1 generates a light emission control signal SE1 according to the first brightness distribution BD1 provided by the first computing unit 130-1 to control the first light-emitting region BR1 to emit light. The second backlight control circuit 140-2 is coupled to the second light-emitting region BR2 and the second computing unit 130-2. The second backlight control circuit 140-2 generates a light emission control signal SE2 according to the second brightness distribution BD2 provided by the second computing unit 130-2 to control the second light-emitting region BR2 to emit light.

The first panel driving circuit 150-1 drives the first display region DR1 of the display panel 110. The second panel driving circuit 150-2 drives the second display region DR2 of the display panel 110. The display panel 110 includes n data lines DL[1] to DL[n]. The first panel driving circuit 130-1 and the second panel driving circuit 130-2 transmit the data signals D[1] to D[n] to the data lines DL[1] to DL[n]. Taking this embodiment as an example, the first panel driving circuit 130-1 is coupled to the data lines DL[1] to DL[m]. The first panel driving circuit 130-1 transmits the data signals D[1] to D[m] to the data lines DL[1] to DL[m]. The second panel driving circuit 130-2 is coupled to the data lines DL[m+1] to DL[n]. The second panel driving circuit 130-2 transmits data signals D[m+1] to D[n] to the data lines DL[m+1] to DL[n].

It should be noted that the first brightness distribution BD1 includes the brightness distribution of the first part P1 of the second display region DR2. The second brightness distribution BD2 includes the brightness distribution of the second part P2 of the first display region DR1. Therefore, the second light-emitting region BR2 of the backlight source 120 may perform brightness compensation based on the brightness distribution of the second part P2. The first light-emitting region BR1 of the backlight source 120 may perform brightness compensation based on the brightness distribution of the first part P1. In this way, the brightness at the boundary B between the first display region DR1 and the second display region DR2 may be improved, and the image quality of the display device 100 may be maintained.

More specifically, in this embodiment, the first computing unit 130-1 receives data signals D[1] to D[m], D[m+1] to D[add1]. The first computing unit 130-1 calculates the first brightness distribution BD1 in the first range R1 according to the data signals D[1] to D[m], D[m+1] to D[add1]. The first brightness distribution BD1 may be a brightness distribution pattern corresponding to the data signals D[1] to D[m], D[m+1] to D[add1]. Similarly, the second computing unit 130-2 receives data signals D[add2] to D[m] and D[m+1] to D[n]. The second computing unit 130-2 calculates the second brightness distribution BD2 in the second range R2 according to the data signals D[add2] to D[m] and D[m+1] to D[n]. The second brightness distribution BD2 may be a brightness distribution pattern corresponding to the data signals D[add2] to D[m] and D[m+1] to D[n], for example, the distribution of the grayscale value of each pixel or each sub-pixel in the image signal.

The data signals D[1] to D[m] correspond to the first display region DR1. The data signals D[m+1] to D[n] correspond to the second display region DR2, where add1 is greater than (m+1) and add2 is less than m. Accordingly, the data signals D[m+1] to D[add1] correspond to the first part P1 of the second display region DR2. The data signals D[add2] to D[m] correspond to the second part P2 of the first display region DR1. The first part P1 is an additional part in the first range R1. The second part P2 is an additional part in the second range R2.

In this embodiment, within the first range R1, the first display region DR1 has a first width W1 in the direction D1, the first part P1 corresponding to the second display region DR2 has a second width W2 in the direction D1, and the ratio of the second width W2 to the first width W1 ranges from 10% to 50%.

In some embodiments, the calculation of the width ratio may be determined depending on the number of traces transmitting signals in each part. For example, when the number of data lines DL corresponding to the first display region DR1 is 1000, and the number of data lines DL corresponding to the first part P1 is 150, the ratio of the widths of the two is 15%.

In this embodiment, the first computing unit 130-1, the first backlight control circuit 140-1 and the first panel driving circuit 150-1 may be integrated into a first circuit block BK1. The second computing unit 130-2, the second backlight control circuit 140-2 and the second panel driving circuit 150-2 may be integrated into a second circuit block BK2.

The first backlight control circuit 140-1 generates a light emission control signal SE1 corresponding to the first brightness distribution BD1 to drive the first light-emitting region BR1. The second backlight control circuit 140-2 generates a light emission control signal SE2 corresponding to the second brightness distribution BD2 to drive the second light-emitting region BR2.

Figure 2:
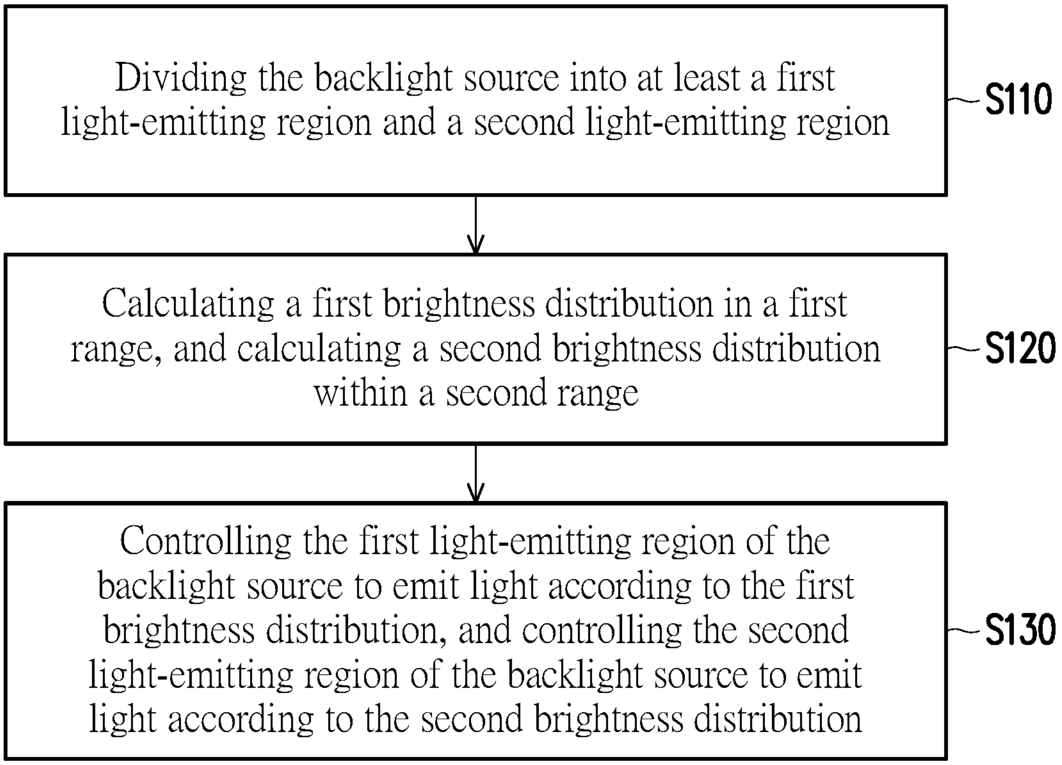
FIG. 2 is a flowchart of a backlight control method according to an embodiment of the disclosure.

Please refer to FIG. 1 and FIG. 2 simultaneously. FIG. 2 is a flowchart of a backlight control method according to an embodiment of the disclosure. The backlight control method is applicable to the display device 100. In step S110, the backlight source 120 is divided into at least the first light-emitting region BR1 and the second light-emitting region BR2. In step S120, the first computing unit 130-1 calculates the first brightness distribution BD1 within the first range R1. The second computing unit 130-2 calculates the second brightness distribution BD2 within the second range R2. In step S130, the first backlight control circuit 140-1 controls the first light-emitting region BR1 of the backlight source 120 to emit light according to the first brightness distribution BD1. The second backlight control circuit 140-2 controls the second light-emitting region BR2 of the backlight source 120 to emit light according to the second brightness distribution BD2. The implementation details of steps S110 to S130 have been clearly described in the embodiment of FIG. 1, so no further details will be repeated here.

Figure 3:
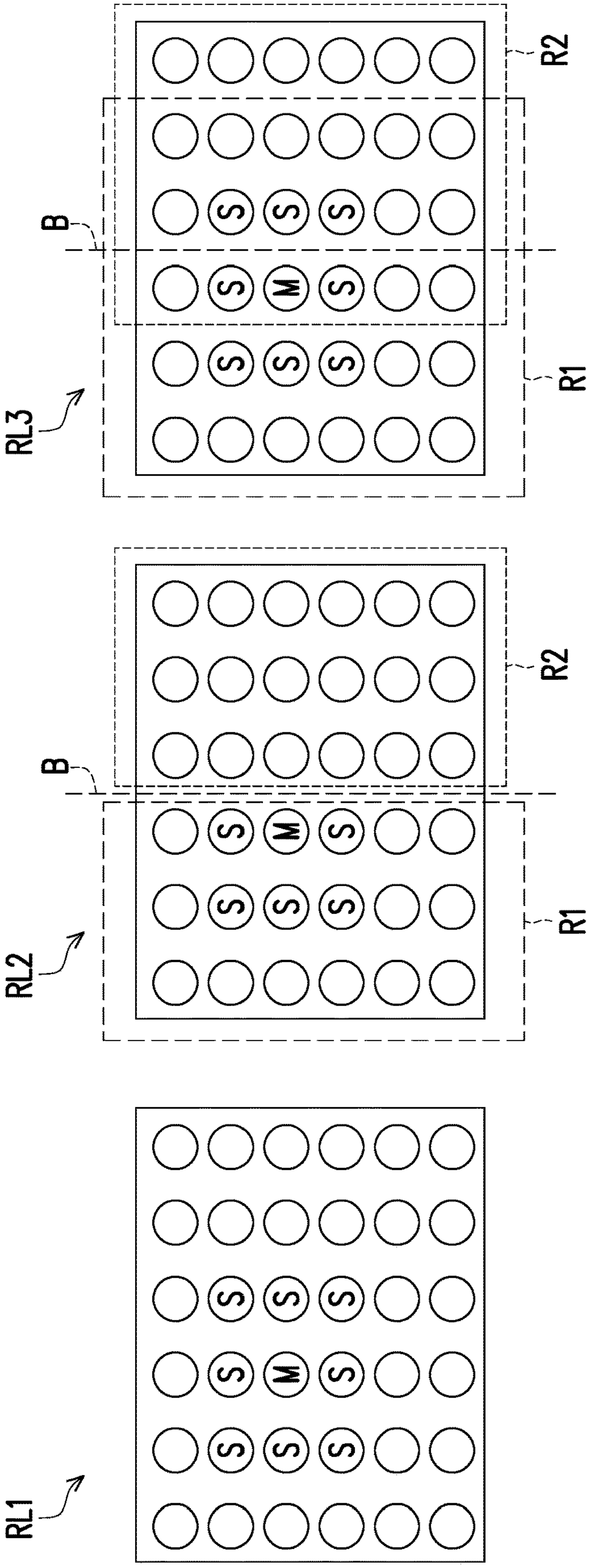
FIG. 3 is a schematic diagram of brightness distribution according to different local dimming methods.

Please also refer to FIG. 3. FIG. 3 is a schematic diagram of light emission according to different local dimming methods. FIG. 3 shows the light emission results RL1, RL2, and RL3 of the backlight source based on different local dimming methods. In this embodiment, the light emission result RL1 is a light emission result in which a backlight source is controlled by a single backlight control circuit to emit light. The light-emitting units marked "M" provide the main brightness. The light-emitting units marked "S" provide supplementary brightness. For example, the main brightness is the rated brightness. The supplementary brightness is, for example but not limited to, 20% of the rated brightness (but the present disclosure is not limited thereto). Once the backlight control circuit determines the position of the light-emitting unit M providing the main brightness, the backlight control circuit determines a plurality of light-emitting units S adjacent to the light-emitting unit M.

The light emission result RL2 is a light emission result that uses two backlight control circuits to control the backlight source to emit light. When the light-emitting unit M is adjacent to the boundary B, in the related art, since the first range R1 and the second range R2 respectively corresponding to the two backlight control circuits do not overlap with each other, among the two backlight control circuits, the backlight control circuit corresponding to the second range R2 is not able to know the brightness distribution corresponding to the first range R1, and another backlight control circuit corresponding to the first range R1 is also unable to know that there are light-emitting units M and adjacent multiple light-emitting units S in the second range R2. Accordingly, neither of the two backlight control circuits may perform brightness compensation in response to brightness in another range. Therefore, the brightness near the boundary B will be insufficient.

The light emission result RL3 is the light emission result of controlling the backlight source to emit light by using the technology disclosed in the present disclosure. The first range R1 and the second range R2 partially overlap each other. Since the first range R1 and the second range R2 corresponding to the two backlight control circuits both cover at least a part of the light-emitting unit M and adjacent multiple light-emitting units S, the two backlight control circuits may perform brightness compensation in response to brightness of another range, so that the light emission result RL3 is similar to the light emission result RL1.

Figure 4:
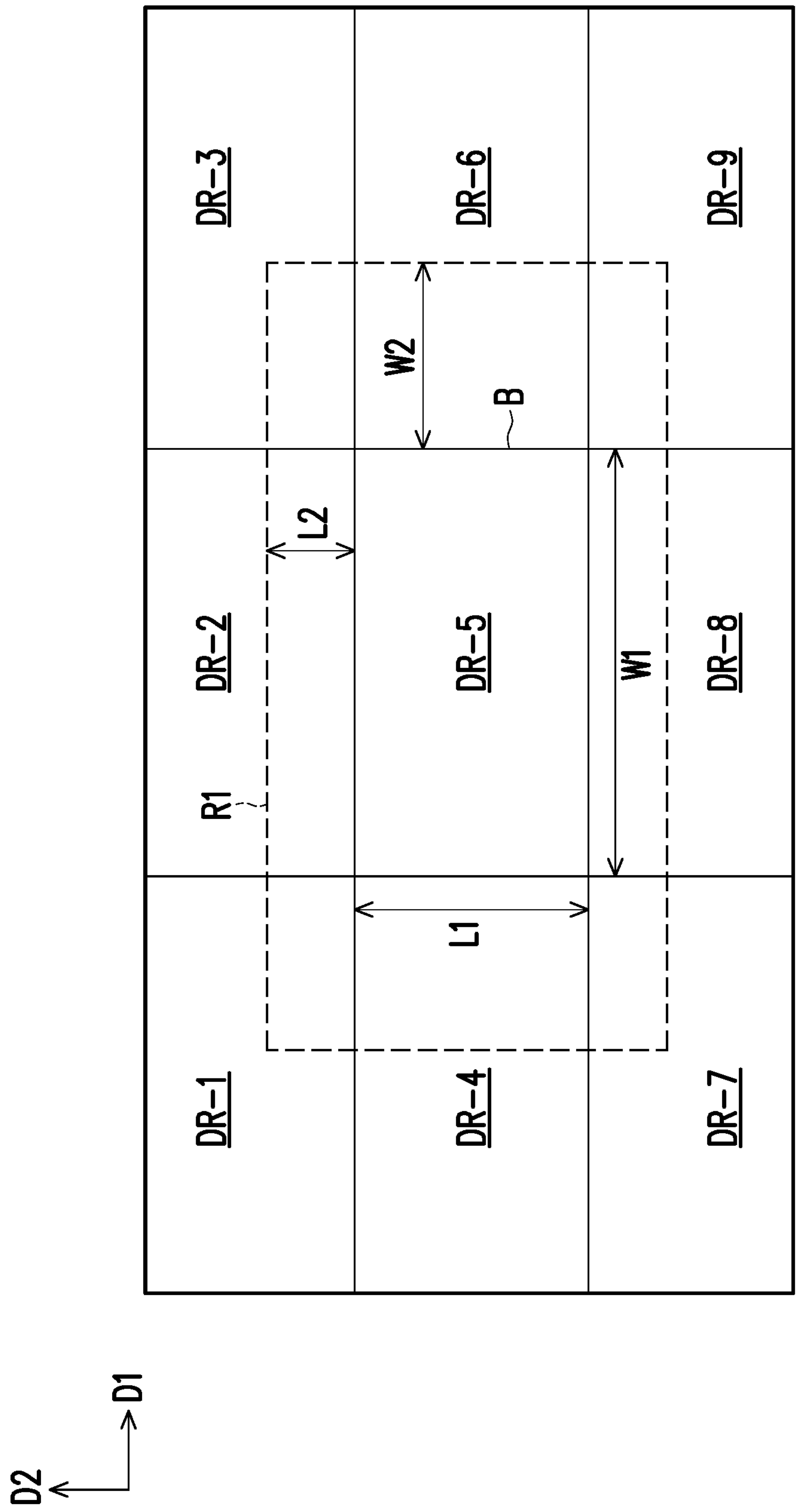
FIG. 4 is a schematic diagram illustrating the relationship between the first range and the light-emitting region according to an embodiment of the present disclosure.

Please refer to FIG. 4. FIG. 4 is a schematic diagram illustrating the relationship between the first range and the display region according to an embodiment of the present disclosure. In this embodiment, FIG. 4 shows the first range R1 and the display regions DR-1 to DR-9. The display regions DR-1 to DR-9 are arranged two-dimensionally. Display regions DR-1 to DR-4 and DR-6 to DR-9 enclose and are adjacent to display region DR-5. The first range R1 covers parts of the display regions DR-1 to DR-4 and DR-6 to DR-9.

In this embodiment, the display region DR-5 has a first width W1 in the direction D1 and a first length L1 in the direction D2, and has a first width W1 in the direction D1 and a first length L1 in the direction D2. The display region DR-2 has a second length L2 in the direction D2. The ratio of the second length L2 to the first length L1 ranges from 10% to 50%. The display region DR-6 has a second width W2 in the direction D1. The ratio of the second width W2 to the first width W1 ranges from 10% to 50%. In order to overcome the problem of insufficient brightness of each display region near the boundary (for example, the boundary B of the display region DR-5), the method adopted in the embodiment of FIG. 1 may be used for brightness compensation. The steps of such method include first increasing the range of data signals received by the computing unit corresponding to each display region (for example, in FIG. 4, the range of data signals received by the computing unit corresponding to the display region DR-5 is extended to R1), then calculating the brightness distribution within respective range according to the data signals received by each computing unit respectively, and finally controlling the backlight source corresponding to each display region respectively according to the calculation results of the brightness distribution.

Figure 5:
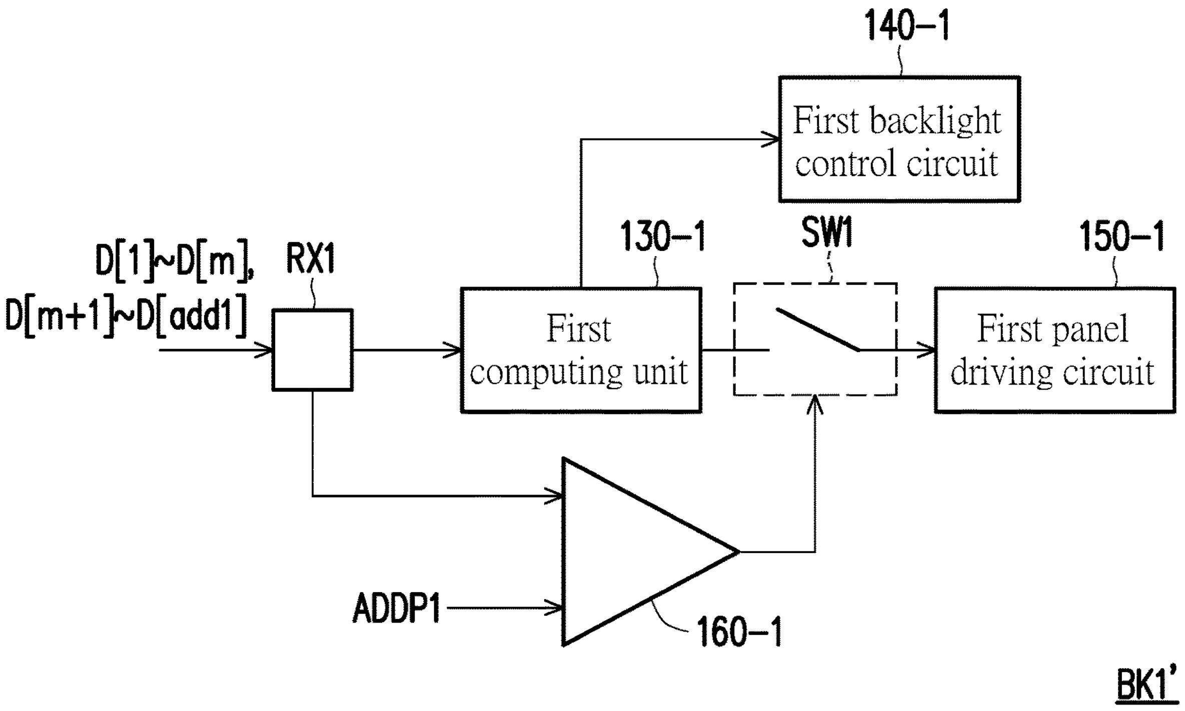
FIG. 5 is a schematic circuit diagram of a first circuit block according to an embodiment of the disclosure.

Please refer to FIG. 1 and FIG. 5 both. FIG. 5 is a schematic circuit diagram of a first circuit block according to an embodiment of the disclosure. The first circuit block BK1' may be used to replace the first circuit block BK1. In this embodiment, the display device 100 further includes a first judging unit 160-1. The first judging unit 160-1 controls the coupling status between the first computing unit 130-1 and the first panel driving circuit 150-1 according to the corresponding position of the driven data line among the data lines DL[1] to DL[n].

Further, taking this embodiment as an example, the display device 100 further includes a connection switch SW1. The connection switch SW1 is coupled between the first computing unit 130-1 and the first panel driving circuit 150-1. The first input terminal of the first judging unit 160-1, for example, receives the data signals D[1] to D[m] and D[m+1] to D[add1] through the receiving port RX1. The second input terminal of the first judging unit 160-1 receives a position reference value ADDP1. The position reference value ADDP1 is a position corresponding to the data lines DL[m+1] to DL[add1]. In other words, the position reference value ADDP1 corresponds to the first part P1. The first judging unit 160-1 controls the connection switch SW1 through the output terminal.

Figure 6:
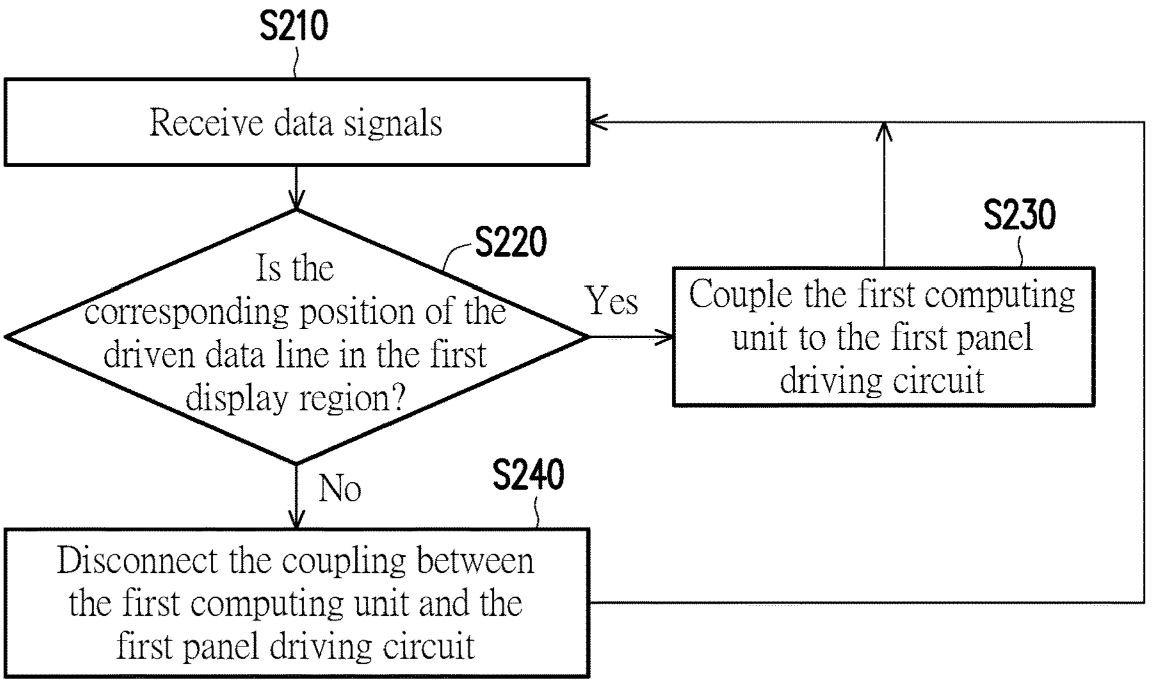
FIG. 6 is a control flowchart according to FIG. 5.

Please refer to FIG. 1, FIG. 5, and FIG. 6 at the same time. FIG. 6 is a control flowchart according to FIG. 5. In this embodiment, the first judging unit 160-1 receives data signals D[1] to D[m] and D[m+1] to D[add1] in step S210. In step S220, the first judging unit 160-1 will utilize the data signals D[1] to D[m] and D[m+1] to D[add1] to determine whether the corresponding position of the driven data line is in the first display region DR1. When the corresponding position of the driven data line is in the first display region DR1, the first judging unit 160-1 will couple the first computing unit 130-1 to the first panel driving circuit 150-1 in step S230. On the other hand, when the corresponding position of the driven data line exceeds the first display region DR1, the first judging unit 160-1 will disconnect the coupling between the first computing unit 130-1 and the first panel driving circuit 150-1 in step S240.

More specifically, in this embodiment, the first judging unit 160-1 uses the data signals D[1] to D[m] and D[m+1] to D[add1] to obtain the number of the data lines corresponding to the first computing unit 130-1, thereby determining the corresponding position. When the number of driven data lines is less than or equal to "m", the first judging unit 160-1 turns on the connection switch SW1. Accordingly, the first panel driving circuit 150-1 receives the data signals D[1] to D[m]. When the number of driven data lines is greater than "m", the first judging unit 160-1 will disconnect the connection switch SW1. Therefore, the first panel driving circuit 150-1 will not receive the data signals D[m+1] to D[add1]. In this way, the first panel driving circuit 150-1 is able to drive the first display region DR1 correctly based on the data signals D[1] to D[m].

In this embodiment, the first judging unit 160-1 is implemented, for example, by at least one comparator circuit or other circuits capable of executing the algorithm of the control flow in FIG. 6. The connection switch SW1 is, for example, implemented by at least one transistor switch or a transmission gate.

Figure 7:
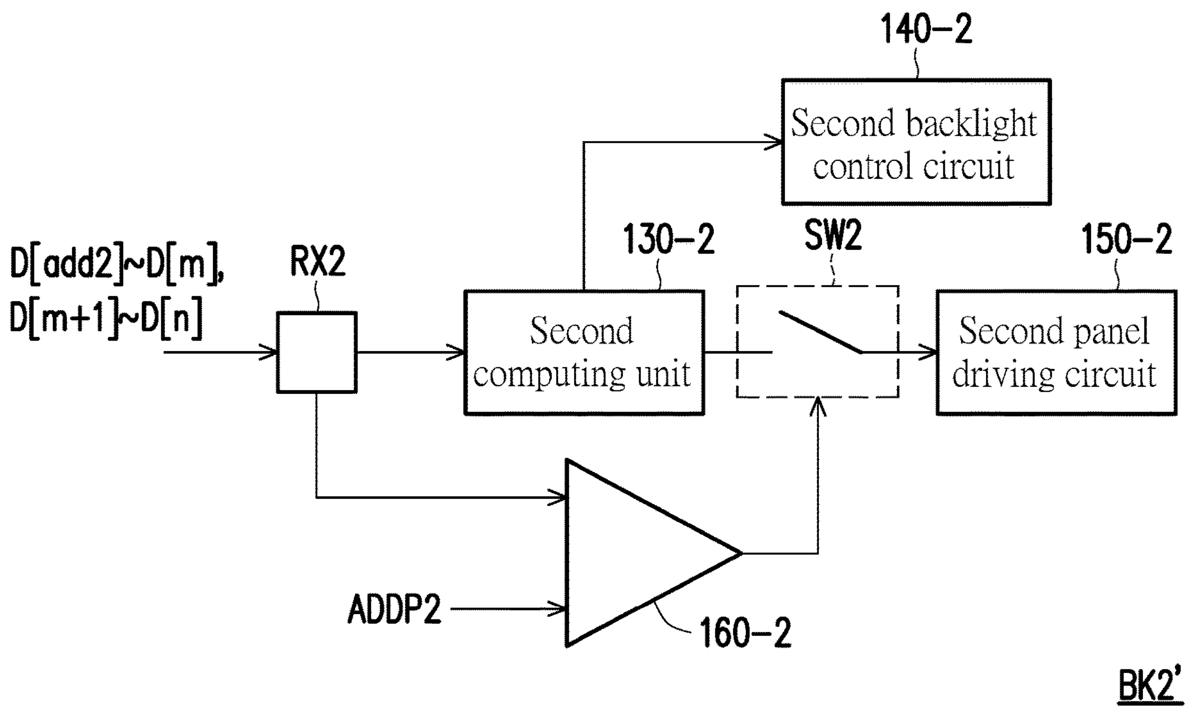
FIG. 7 is a schematic circuit diagram of a second circuit block according to an embodiment of the disclosure.

Please refer to FIG. 1 and FIG. 7 at the same time. FIG. 7 is a schematic circuit diagram of a second circuit block according to an embodiment of the disclosure. The second circuit block BK2' may be adopted to replace the second circuit block BK2. In this embodiment, the display device 100 further includes a second judging unit 160-2. The second judging unit 160-2 controls the coupling status between the second computing unit 130-2 and the second panel driving circuit 150-2 according to the corresponding position of the driven data line among the data lines DL[1] to DL[n].

Further, taking this embodiment as an example, the display device 100 further includes a connection switch SW2.

The connection switch SW1 is coupled between the second computing unit 130-2 and the second panel driving circuit 150-2. The first input terminal of the second judging unit 160-2, for example, receives data signals D[add2] to D[m] and D[m+1] to D[n] through the receiving port RX2. The second input terminal of the second judging unit 160-2 receives the position reference value ADDP2. The position reference value ADDP2 is a position corresponding to the data lines D[add2] to D[m]. In other words, the position reference value ADDP2 corresponds to the second part P2. The second judging unit 160-2 controls the connection switch SW2 through the output terminal.

Figure 8:
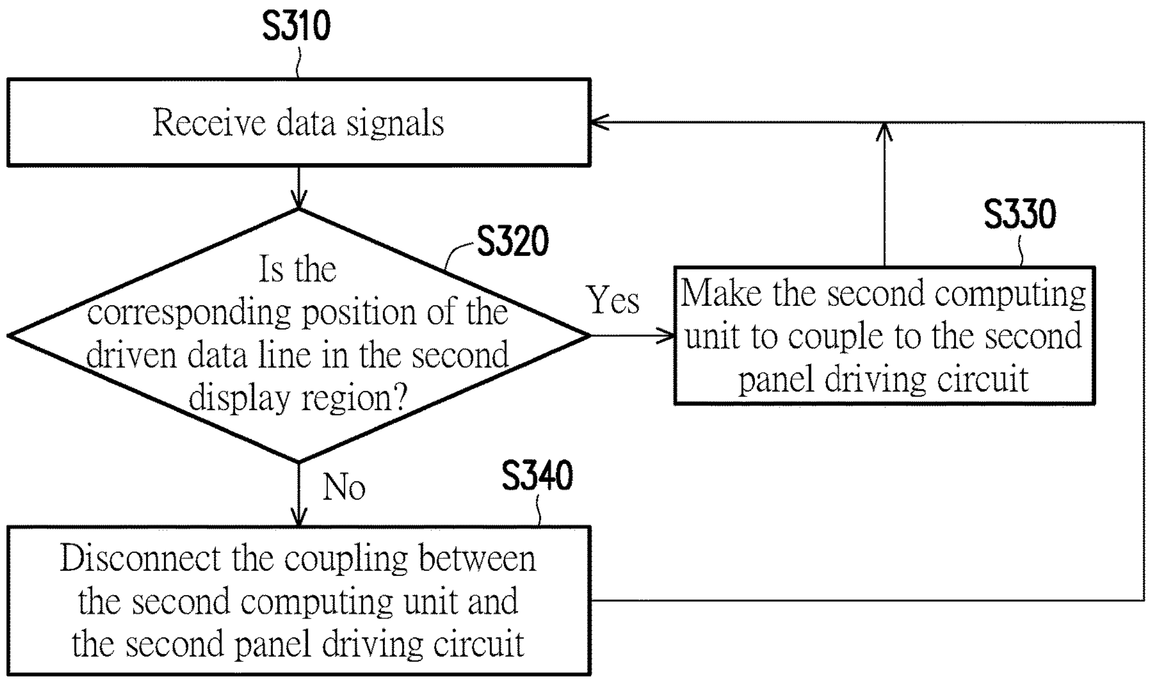
FIG. 8 is a control flowchart according to FIG. 7.

Please refer to FIG. 1, FIG. 7, and FIG. 8 at the same time. FIG. 8 is a control flowchart according to FIG. 7. In this embodiment, the second judging unit 160-2 receives data signals D[add2] to D[m] and D[m+1] to D[n] in step S310. In step S320, the second judging unit 160-2 will use the data signals D[add2] to D[m] and D[m+1] to D[n] to determine whether the corresponding position of the driven data line is in the second display region DR2. When the corresponding position of the driven data line is in the second display region DR2, the second judging unit 160-2 will make the second computing unit 130-2 to couple to the second panel driving circuit 150-2 in step S330. On the other hand, when the corresponding position of the driven data line exceeds the second display region DR2, the second judging unit 160-2 will disconnect the coupling between the second computing unit 130-2 and the second panel driving circuit 150-2 in step S340.

More specifically, in this embodiment, the second judging unit 160-2 uses the data signals D[add2] to D[m] and D[m+1] to D[n] to know the number of the driven data lines, thereby determining the corresponding position. When the number of driven data lines is less than "m+1", the second judging unit 160-2 disconnects the connection switch SW2. Therefore, the second panel driving circuit 150-2 does not receive the data signals D[add2] to D[m]. When the number of driven data lines is greater than or equal to "m+1", the second judging unit 160-2 will turn on the connection switch SW2. Accordingly, the second panel driving circuit 150-2 receives the data signals D[m+1] to D[n]. In this way, the second panel driving circuit 150-2 is able to drive the second display region DR2 correctly based on the data signals D[m+1] to D[n].

In this embodiment, the second judging unit 160-2 is implemented, for example, by at least one comparator circuit or other circuits that can execute the algorithm of the control flow in FIG. 8. The connection switch SW2 is, for example, implemented by at least one transistor switch or transmission gate.

Figure 9:
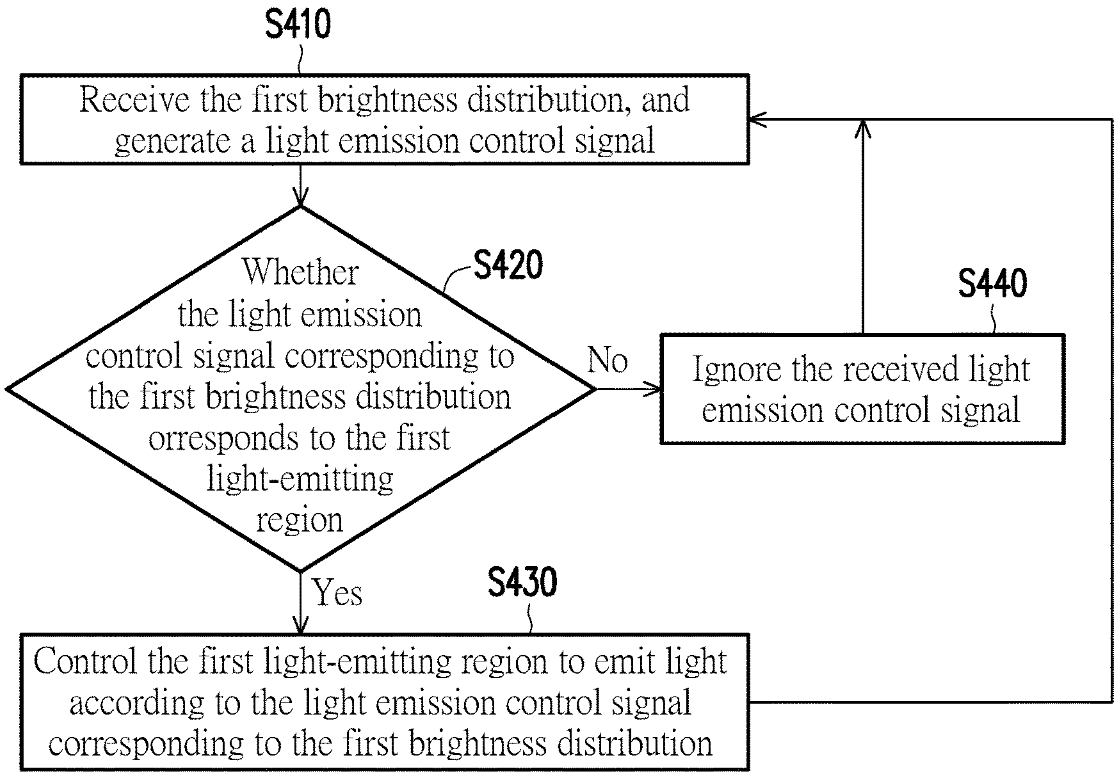
FIG. 9 is a control flowchart of the first backlight control circuit according to an embodiment of the disclosure.

Please refer to FIG. 1 and FIG. 9 at the same time. FIG. 9 is a control flowchart of the first backlight control circuit according to an embodiment of the disclosure. In this embodiment, the first backlight control circuit 140-1 may operate based on the control flow shown in FIG. 9. In step S410, the first backlight control circuit 140-1 receives the corresponding first brightness distribution BD1, and generates a light emission control signal SE1 corresponding to the first brightness distribution BD1. The first backlight control circuit 140-1 determines whether the light emission control signal SE1 corresponding to the first brightness distribution BD1 corresponds to the first light-emitting region BR1 in step S420. When it is determined that the light emission control signal SE1 corresponds to the first light-emitting region BR1, the first backlight control circuit 140-1 controls the first light-emitting region BR1 to emit light according to the light emission control signal SE1 in step S430. When the light emission control signal SE1 does not correspond to the first light-emitting region BR1, the first backlight control circuit 140-1 ignores the received light emission control signal SE1 in step S440.

Figure 10:
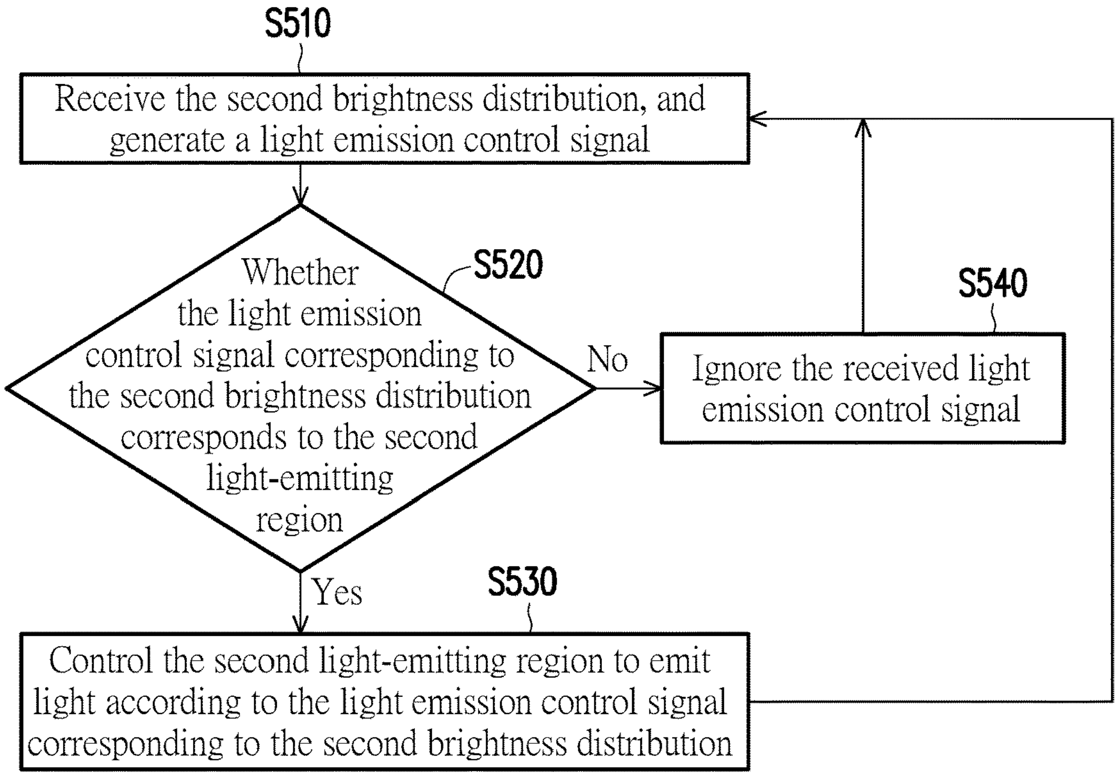
FIG. 10 is a control flowchart of the second backlight control circuit according to an embodiment of the disclosure.

Please refer to FIG. 1 and FIG. 10 at the same time. FIG. 10 is a control flowchart of the second backlight control circuit according to an embodiment of the disclosure. In this embodiment, the second backlight control circuit 140-2 may operate based on the control flow shown in FIG. 10. In step S510, the second backlight control circuit 140-2 receives the second brightness distribution BD2, and generates a light emission control signal SE2 corresponding to the second brightness distribution BD2. The second backlight control circuit 140-2 determines whether the light emission control signal SE2 corresponding to the second brightness distribution BD2 corresponds to the second light-emitting region BR2 in step S520. When the light emission control signal SE2 corresponds to the second light-emitting region BR2, the second backlight control circuit 140-2 controls the second light-emitting region BR2 to emit light according to the light emission control signal SE2 in step S530. When the light emission control signal SE2 does not correspond to the second light-emitting region BR2, the second backlight control circuit 140-2 ignores the received light emission control signal SE2 in step S540.

Figure 11:
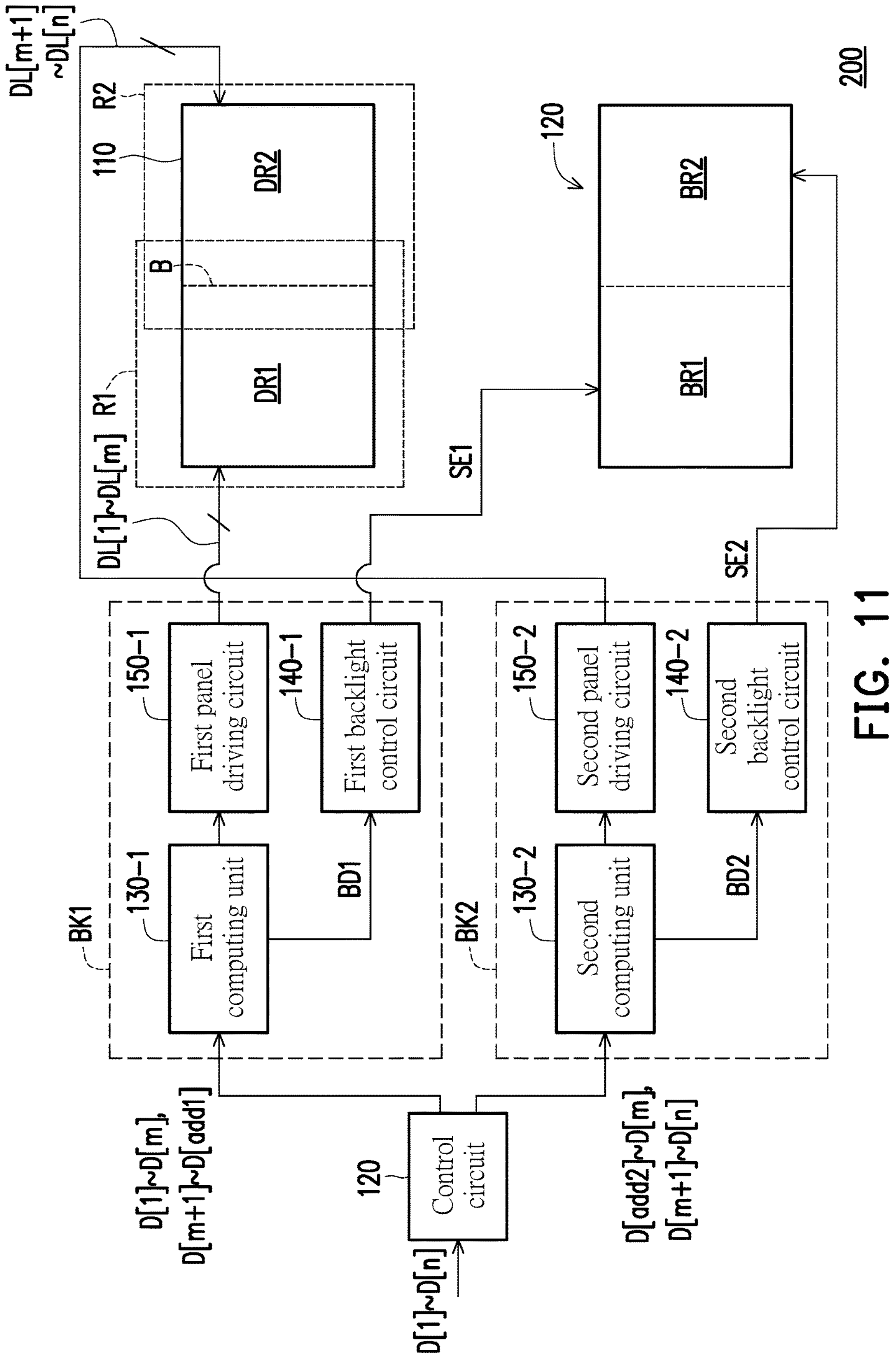
FIG. 11 is a schematic diagram of a display device according to a second embodiment of the disclosure.

Please refer to FIG. 11. FIG. 11 is a schematic diagram of a display device according to a second embodiment of the disclosure. In this embodiment, the display device 200 includes a display panel 110, a backlight source 120, a first computing unit 130-1, a second computing unit 130-2, a first backlight control circuit 140-1, a second backlight control circuit 140-2, a first panel driving circuit 150-1, a second panel driving circuit 150-2 and a control circuit 270. The implementation details of the display panel 110, the backlight source 120, the first computing unit 130-1, the second computing unit 130-2, the first backlight control circuit 140-1, the second backlight control circuit 140-2, the first panel driving circuit 150-1 and the second panel driving circuit 150-2 have been clearly described in the multiple embodiments of FIG. 1 to FIG. 10, so no further description will be incorporated here.

In this embodiment, the control circuit 270 is coupled to the first computing unit 130-1 and the second computing unit 130-2. The control circuit 270 receives the data signals D[1] to D[n], and distributes the data signals D[1] to D[n] to the first computing unit 130-1 and the second computing unit 130-2 according to the first range R1 and the second range R2.

Further, the control circuit 270 sends the data signals D[1] to D[m] and D[m+1] to D[add1] to the first computing unit 130-1 according to the first range R1. The control circuit 270 sends the data signals D[add2] to D[m] and D[m+1] to D[n] to the second computing unit 130-2 according to the second range R2.

Figure 12:
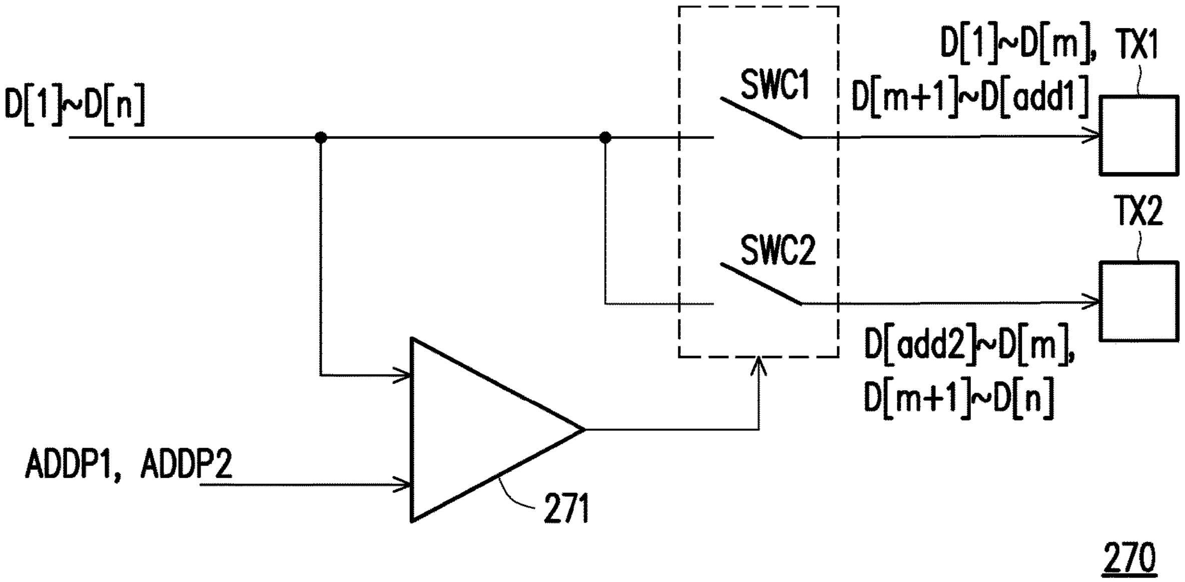
FIG. 12 is a schematic diagram of the control circuit according to FIG. 11.

Please refer to FIG. 11 and FIG. 12 at the same time. FIG. 12 is a schematic diagram of the control circuit according to FIG. 11. In this embodiment, the control circuit 270 includes a channel judging unit 271, channel switches SWC1 and SWC2, as well as transmission ports TX1 and TX2. The first terminal of the channel switch SWC1 receives data signals D[1] to D[n]. The second terminal of the channel switch SWC1 is coupled to the first computing unit 130-1 through the transmission port TX1. The first terminal of the channel switch SWC2 receives data signals D[1] to D[n]. The second terminal of the channel switch SWC2 is coupled to the second computing unit 130-2 through the transmission port TX2. The first input terminal of the channel judging unit 271 receives data signals D[1] to D[n]. The second input terminal of the channel judging unit 271 receives position reference values ADDP1 and ADDP2. The channel judging unit 271 controls the connection switches SWC1 and SWC2 through the output terminal.

Figure 13A:
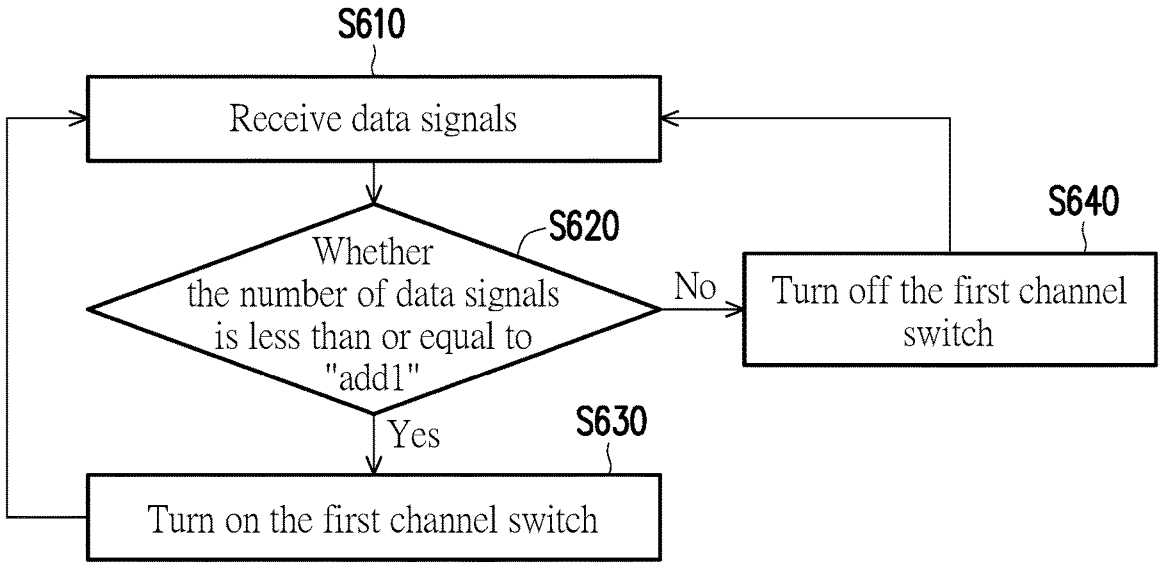
FIG. 13A and FIG. 13B are respectively control flowcharts of the control circuit according to FIG. 12.
Figure 13B:
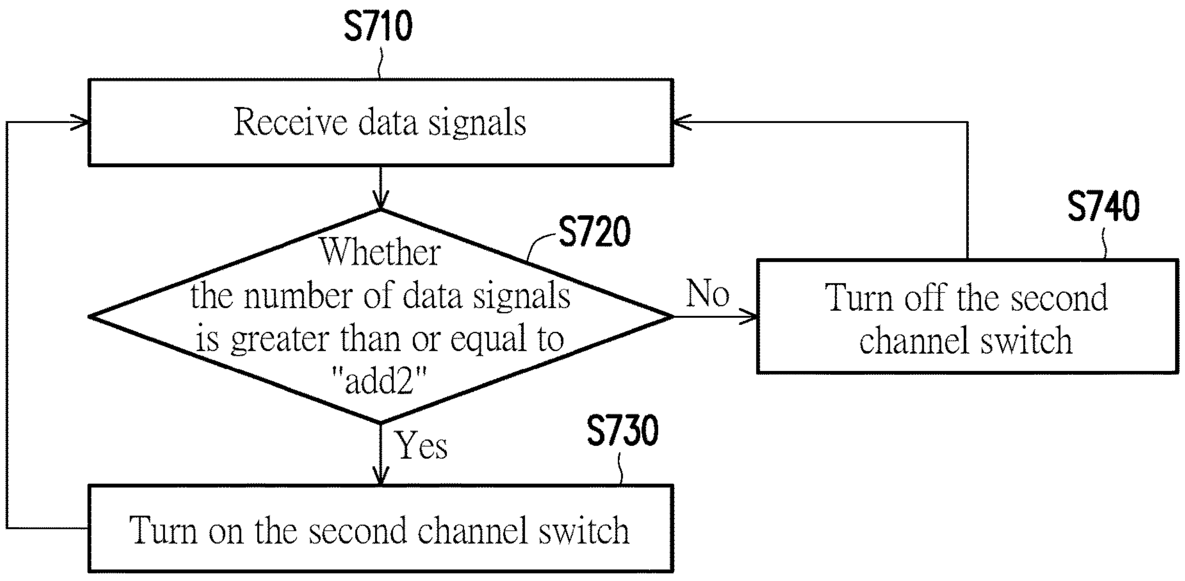

Please refer to FIG. 12, FIG. 13A and FIG. 13B at the same time. FIG. 13A and FIG. 13B are respectively control flowcharts of the control circuit according to FIG. 12. In this embodiment, the channel judging unit 271 executes the control flow shown in FIG. 13A and FIG. 13B. In step S610, the channel judging unit 271 receives data signals D[1] to D[n]. In step S620, the channel judging unit 271 determines the number of received data signals based on the position reference value ADDP1. When the number of data signals is less than or equal to "add1", the channel judging unit 271 turns on the channel switch SWC1 in step S630. Therefore, the control circuit 270 transmits the data signals D[1] to D[m] and D[m+1] to D[add1] to the first computing unit 130-1 through the transmission port TX1. When the number of data signals is greater than "add1", the channel judging unit 271 turns off the channel switch SWC1 in step S640.

In step S710, the channel judging unit 271 receives data signals D[1] to D[n]. In step S720, the channel judging unit 271 determines the number of received data signals based on the position reference value ADDP2. When the number of data signals is greater than or equal to "add2", the channel judging unit 271 turns on the channel switch SWC2 in step S730. Therefore, the control circuit 270 sends the data signals D[add2] to D[m] and D[m+1] to D[n] to the second computing unit 130-2 through the transmission port TX2. When the number of data signals is less than "add2", the channel judging unit 271 turns off the channel switch SWC2 in step S740.

In this embodiment, the channel judging unit 271 is implemented, for example, by at least one comparator circuit or other circuits that can execute the algorithm of the control flow shown in FIG. 13A and FIG. 13B. The channel switches SWC1 and SWC2 are respectively implemented by at least one transistor switch or transmission gate, for example.

To sum up, the first computing unit calculates the first brightness distribution in the first range. The first range includes the first display region and the first part of the second display region. The second computing unit calculates a second brightness distribution within a second range. The second range includes the second display region and the second part of the first display region. Therefore, in the case that a plurality of backlight control circuits perform regional dimming in a divisional manner, the brightness at the boundary between the first display region and the second display region will not be reduced, so that the image quality of the display device may be maintained.

Finally, it should be noted that the above embodiments are only configured to illustrate the technical solution of the present disclosure, rather than limit it. Although the present disclosure has been described in detail with reference to the foregoing embodiments, those of ordinary skill in the art should understand that: It is still possible to modify the technical solutions described in the foregoing embodiments, or perform equivalent replacements for some or all of the technical features; and these modifications or replacements do not make the essence of the corresponding technical solutions deviate from the scope of technical solutions of the embodiments disclosed in this disclosure.

What is claimed is:

1. A display device, comprising:

a display panel, comprising a first display region and a second display region;

a backlight source, disposed below the display panel, and comprising a first light-emitting region and a second light-emitting region, wherein the first light-emitting region corresponds to the first display region, and the second light-emitting region corresponds to the second display region; and a first computing unit, configured to calculate a first brightness distribution within a first range; and a second computing unit, configured to calculate a second brightness distribution within a second range, wherein the first range comprises the first display region and a first part of the second display region, the second range comprises the second display region and a second part of the first display region, the first light-emitting region of the backlight source emits light according to the first brightness distribution, and the second light-emitting region of the backlight source emits light according to the second brightness distribution.

2. The display device according to claim 1, wherein:

within the first range, the first display region has a first width in a direction, the first part corresponding to the second display region has a second width in the direction, and a ratio of the second width to the first width ranges from 10% to 50%.

3. The display device according to claim 1, further comprising:

a first backlight control circuit, coupled to the first light-emitting region and the first computing unit; and a second backlight control circuit, coupled to the second light-emitting region and the second computing unit.

4. The display device according claim 3, wherein the first backlight control circuit determines whether a first light emission control signal corresponding to the first brightness distribution corresponds to the first light-emitting region.

5. The display device according to claim 4, wherein when the first light emission control signal corresponds to the first light-emitting region, the first backlight control circuit controls the first light-emitting region to emit light according to the first light emission control signal, when the first light emission control signal does not correspond to the first light-emitting region, the first backlight control circuit ignores the first light emission control signal.

6. The display device according to claim 3, wherein the second backlight control circuit determines whether a second light emission control signal corresponding to the second brightness distribution corresponds to the second light-emitting region.

7. The display device according to claim 6, wherein:

when the second light emission control signal corresponds to the second light-emitting region, the second backlight control circuit controls the second light-emitting region to emit light according to the second light emission control signal, when the second light emission control signal does not correspond to the second light-emitting region, the second backlight control circuit ignores the second light emission control signal.

8. The display device according to claim 1, further comprising:

a first panel driving circuit, configured to drive the first display region; and a second panel driving circuit, configured to drive the second display region, wherein the display panel comprises a plurality of data lines, and the first panel driving circuit and the second panel driving circuit transmit data signals to the plurality of data lines.

9. The display device according to claim 8, further comprising:

a first judging unit, configured to control a coupling status between the first computing unit and the first panel driving circuit according to a corresponding position of a driven data line among the plurality of data lines.

10. The display device according to claim 9, wherein:

when the corresponding position of the driven data line is in the first display region, the first judging unit is coupled to the first computing unit and the first panel driving circuit, and when the corresponding position of the driven data line exceeds the first display region, the first judging unit disconnects the coupling status between the first computing unit and the first panel driving circuit.

11. The display device according to claim 9, further comprising:

a second judging unit, configured to control a coupling status between the second computing unit and the second panel driving circuit according to the corresponding position of the driven data line among the plurality of data lines.

12. The display device according to claim 11, wherein:

when the corresponding position of the driven data line is in the second display region, the second judging unit is coupled to the second computing unit and the second panel driving circuit, and when the corresponding position of the driven data line exceeds the second display region, the second judging unit disconnects the coupling status between the second computing unit and the second panel driving circuit.

13. A backlight control method for a display device, wherein the display device comprises a display panel, a backlight source, a first computing unit, and a second computing unit, wherein the display panel comprises a first display region and a second display region, wherein the control method comprises:

dividing the backlight source into at least a first light-emitting region and a second light-emitting region, wherein the first light-emitting region corresponds to the first display region, and the second light-emitting region corresponds to the second display region;

calculating a first brightness distribution in a first range by the first computing unit, and calculating a second brightness distribution within a second range by the second computing unit, wherein the first range comprises the first display region and a first part of the second display region, and the second range comprises the second display region and a second part of the first display region; and controlling the first light-emitting region of the backlight source to emit light according to the first brightness distribution, and controlling the second light-emitting region of the backlight source to emit light according to the second brightness distribution.

14. The backlight control method according to claim 13, wherein the display device further comprises:

a first backlight control circuit, coupled to the first light-emitting region and the first computing unit; and a second backlight control circuit, coupled to the second light-emitting region and the second computing unit.

15. The backlight control method according to claim 14, further comprising:

determining whether a first light emission control signal corresponding to the first brightness distribution corresponds to the first light-emitting region by the first backlight control circuit.

16. The backlight control method according to claim 15, further comprising:

when the first light emission control signal corresponds to the first light-emitting region, controlling the first light-emitting region to emit light by the first backlight control circuit according to the first light emission control signal, when the first light emission control signal does not correspond to the first light-emitting region, ignoring the first light emission control signal by the first backlight control circuit.

17. The backlight control method according to claim 14, further comprising:

determining whether a second light emission control signal corresponding to the second brightness distribution corresponds to the second light-emitting region by the second backlight control circuit.

18. The backlight control method according to claim 13, wherein the display device further comprises:

a first panel driving circuit, configured to drive the first display region; and a second panel driving circuit, configured to drive the second display region, wherein the display panel comprises a plurality of data lines, and the first panel driving circuit and the second panel driving circuit transmit data signals to the plurality of data lines.

19. The backlight control method according to claim 18, further comprising:

controlling a coupling status between the first computing unit and the first panel driving circuit according to a corresponding position of a driven data line among the plurality of data lines.

20. The backlight control method according to claim 19, further comprising:

when the corresponding position of the driven data line is in the first display region, coupling the first computing unit to the first panel driving circuit, and when the corresponding position of the driven data line exceeds the first display region, disconnecting the coupling status between the first computing unit and the first panel driving circuit.

* * * * *